United States Patent [19]

Sharpe et al.

[11] Patent Number: 5,181,028
[45] Date of Patent: Jan. 19, 1993

[54] 3D STEREO INTEGRATED ATTITUDE DIRECTOR AND HORIZONTAL SITUATION INDICATOR APPARATUS

[75] Inventors: Tom G. Sharpe; C. James Styers, both of Cedar Rapids; James M. Suiter, Marion, all of Iowa

[73] Assignee: Rockwell International Corporation, Seal Beach, Calif.

[21] Appl. No.: 540,962

[22] Filed: Jun. 20, 1990

[51] Int. Cl.⁵ .............................................. G01C 21/00
[52] U.S. Cl. .................................. 340/974; 340/975; 340/979; 359/478
[58] Field of Search ............... 340/974, 975, 979, 967, 340/971, 973, 980; 33/328, 350; 364/434, 435; 73/178 R; 434/51; 350/130, 133, 134, 138, 144, 145; 359/462, 466, 467, 472, 478, 480

[56] References Cited

U.S. PATENT DOCUMENTS

| | | | |
|---|---|---|---|
| 2,941,306 | 6/1960 | Uecker | 33/330 |
| 3,161,375 | 12/1964 | Ruhge | 250/211 J |
| 3,516,055 | 6/1970 | Snider | 33/330 |
| 4,305,057 | 12/1981 | Rolston | 340/974 |
| 4,315,240 | 2/1982 | Spooner | 340/980 |
| 4,419,079 | 12/1983 | Georges et al. | 340/973 |
| 4,513,509 | 4/1985 | Nordström | 340/974 |
| 4,882,845 | 11/1989 | Boyer | 340/973 |
| 4,914,733 | 4/1990 | Gralnick | 340/961 |
| 4,977,401 | 12/1990 | Sjöberg | 340/975 |
| 4,994,794 | 2/1991 | Price et al. | 340/980 |

OTHER PUBLICATIONS

Proceedings of the Human Factors Society, 32nd Annual Meeting, 1988, pp. 58-62, "Stereopsis in Cockpit Display-A Part-Task Test", Thomas Way.

*Primary Examiner*—Jin F. Ng
*Assistant Examiner*—Brent A. Swarthout
*Attorney, Agent, or Firm*—Bruce C. Lutz; Kyle Eppele; H. Fredrick Hamann

[57] ABSTRACT

An integrated attitude director indicator and horizontal situation indicator is disclosed that utilizes stereopsis to combine information that normally requires two display surfaces onto a single electronic display. One embodiment of the display comprises left and right eye versions alternately presented on the display in synchronism with alternate eye shuttered lenses worn by the viewer. The viewer has an instantaneous sense of the real world direction from his aircraft as apparently suspended within a spherical grid. The integrated display provides a presentation somewhat similar to existing flat screen separate instruments with an aircraft symbol lying at the center of the sphere with roll, pitch and heading scales displayed on this sphere. The sphere itself has one color such as blue above the horizon line and a different color such as brown below the horizon line. An additional feature comprises situational awareness cues, such as aircraft symbols, in the form of boxes on the spherical grid at a relative polar coordinate angle from the aircraft containing the instruments. These aircraft symbols may be color coded to represent threats, friendlies or unknowns. These situational cues allow the pilot to monitor and take evasive action with respect to such nearby aircraft.

8 Claims, 3 Drawing Sheets

3D STEREO INTEGRATED ATTITUDE DIRECTOR AND HORIZONTAL SITUATION INDICATOR APPARATUS

THE INVENTION

The present invention is generally related to aircraft displays and more specifically related to an integrated display providing pitch, roll and heading information to a viewer. Even more specifically, the present invention is concerned with an integrated display using stereopsis techniques to give the viewer a spacial sense of the relationship of his aircraft with respect to a reference such as earth and the surrounding environment.

BACKGROUND OF THE INVENTION

The prior art displays known to the present inventors typically involved an attitude director indicator (ADI) where, among other details, information is provided as to the roll of an airplane and its degree of climb or descent with respect to level. Typically, there are warning indicators when the rate of descent or climb is nearing and/or exceeding preset values. A separate horizontal situation indicator (HSI) typically provides, among other details, heading information and shows the craft's heading with respect to some North reference such as true North or magnetic North.

Since it is normally desirable to reduce the number of required display surfaces in an airplane, and since a pilot must perform a certain amount of mental integration to combine the information from two separately situated displays, the inventors have provided the present approach to a display which uses electronics to integrate the presentation to the pilot or other viewer. Although left out of the drawings for clarity of presentation, other non-attitude and heading cues normally found on present day ADI's and HSI's are considered to be a part of the present inventive concept presentation capability even though not specifically recited herein. Lateral image disparity cues are used to stimulate a depth sense (stereopsis) in the viewer so that this large amount of information can be presented spacially distinct and relevant form. The observer perceives depth in the display and thus, senses that certain objects are in front of or behind other objects. Without stereopsis, this presentation would be overly cluttered and difficult to interpret.

The stereopsis may be produced by any of several well-known means. One approach is disclosed in the present application wherein alternating left and right eye perspective views, images or pictures of a 3D situation are presented on a CRT screen. The concept uses switching LCD glasses or lenses to unmask the appropriate view to each eye in turn. In other words, the left eye sees only left eye images and the right eye sees only right eye images.

In concept, the aircraft symbol is visualized as lying at the center of a spherical grid with roll, pitch and heading scales displayed in conjunction with the sphere. For clarity of presentation and similarity to existing aircraft instruments, the aircraft symbol and roll scale are locked in a plane parallel to the display surface. A roll pointer is also located on the display's surface plane. This pointer tracks the intersection of the pitch scale with a display surface as the pitch scale moves in conjunction with roll and pitch movements during aircraft maneuvers. The nose of the 3D aircraft symbol always points to the current pitch value.

In the embodiment shown, the pitch and roll rotation axes are orthogonal. Similarly, the pitch and heading rotation axes are orthogonal to each other although heading is not orthogonal to roll. Current heading value is indicated by the intersection of the pitch scale with the heading scale.

If the viewpoint of the observer is placed to look directly along the longitudinal axis of the 3D aircraft symbol, this instrument presentation is very similar to a conventional attitude director indicator. The surface of the sphere is represented by a fine mesh or grid colored blue above the horizon line (sky) and brown below the horizon line (earth). However, unlike a conventional attitude director indicator, heading indication is added, and the heading scale appears curved when a pitch angle is applied. Generally speaking, however, the display may be regarded as an extension of a conventional attitude director indicator directly into three dimensional information as far as the pilot of the aircraft is concerned.

Once the sphere is visualized with the aircraft at the center, situational awareness cues can be added to the display, showing a complete global view of military threats, or civilian traffic environment. A vector drawn from the viewer's aircraft to a threat in the real world can be visualized in the display domain as a vector from the aircraft symbol to the three dimensional representation of the threat. A window drawn around where that vector pierces the display sphere would then frame the relative polar coordinate angle of that threat. Color coding of the window can also be used wherein, as an example, red may be used for threats, green for friendly craft, and yellow for unknowns.

Like a conventional attitude director indicator, this format is an inside out presentation. It presents pictorially what the pilot would see looking out the window of the aircraft. Once the cue window appears on the sphere, the observer has an instantaneous sense of the real world direction from his aircraft to the threat. For example, if sensors or data linked information reveals a threat above, behind and to the left of the viewer's aircraft, the "cue window" will appear on the sphere above, behind and to the left of the aircraft representation. This cues the pilot to take evasive action with respect to the threat at that location.

It is thus an object of the present invention to provide an improved craft situation indicator.

Other objects and advantages will be apparent from a reading of the specification in conjunction with the drawings wherein.

DETAILED DESCRIPTION

Figure 1:
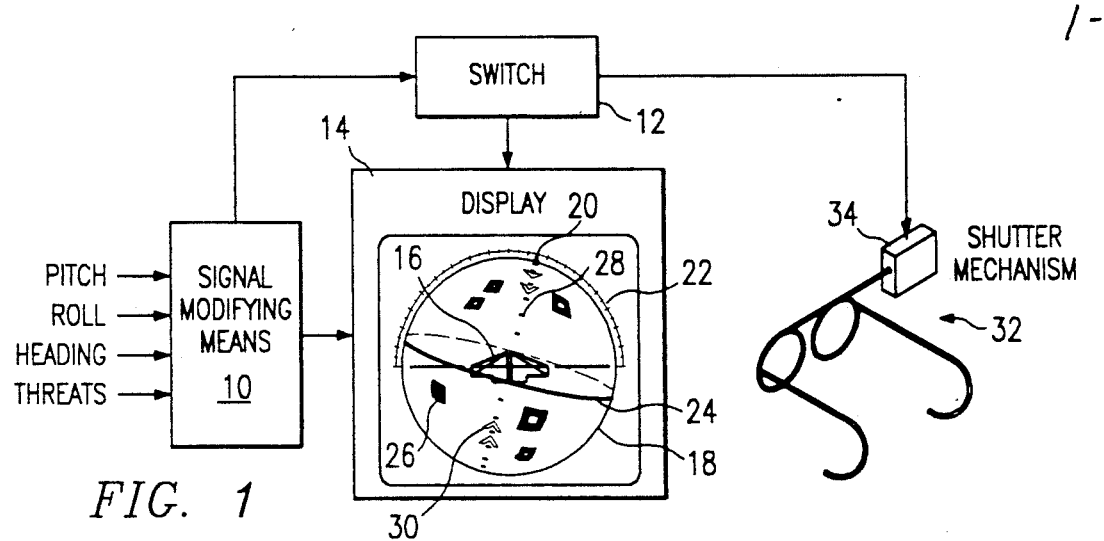
FIG. 1 is a block diagram of the inventive concept.

In FIG. 1 a signal modifying block 10 is shown with inputs of pitch, roll, heading and threats, and an output to a switch block 12 as well as to a display block 14. Within the display block 14, is shown a representation of a craft 16 within a spherical grid shown by circle 18. The circle 18 contains a pointer 20 which indicates the roll of the plane on a roll indicator grid 22. The roll is also illustrated by the ellipsoid 24 representing the division between the upper and lower portions of the spherical grid. One of the several threats shown is designated as 26 and there is also shown an indicator scale as 28 along with excessive pitch warning indicators 30. A set of lenses, goggles or eyeglasses is shown generally as 32 containing a shutter mechanism block 34 which receives signals from switch 12. Switch 12 also sends similar signals to display 14 so that the left and right eye views will be synchronized with the operation of the lenses 32 by shutter mechanism 34.

Figure 2:
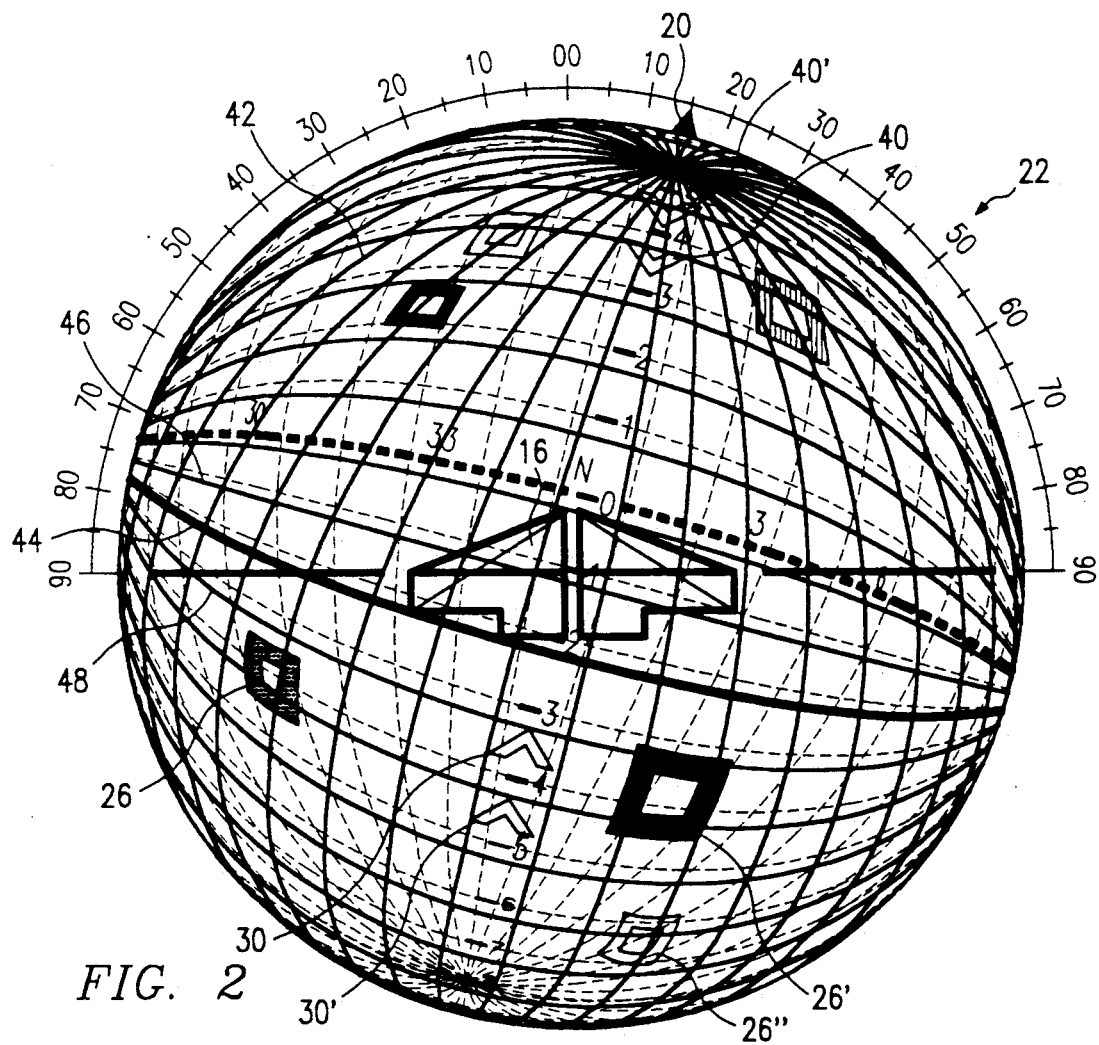
FIG. 2 is an attempt to provide more details of the 3D view primitively shown in FIG. 1.

In FIG. 2 the same designations are used as in FIG. 1 where appropriate. The solid lines represent lines that would appear by the viewer as extending outwardly from the surface of the display while the dash lines represent those which would appear to be recessed into the surface of the display. The result is a spherical appearing grid. The generally vertical lines such as 42 come together at a point like the lines of longitude used to mark position on the earth's surface from a reference zero meridian. The dark line 44 represents the division between the top half of the sphere and the bottom half of the sphere wherein one embodiment of the invention, the grid above 44, in comprising lines such as 46 were colored in a color such as blue to suggest sky while lines such as 48 below the line 44 were brown to suggest earth. The lines such as 44, 46, and 48 do not run parallel as do lines of latitude on the earth's surface, but rather intersect at a common point in a manner similar to that of lines of longitude. Due to difficulties in drafting the presentation, these points of intersection are not as accurately presented as shown, in an embodiment reduced to practice but rather are merely similar to the actual display seen by the viewer.

Figure 3:
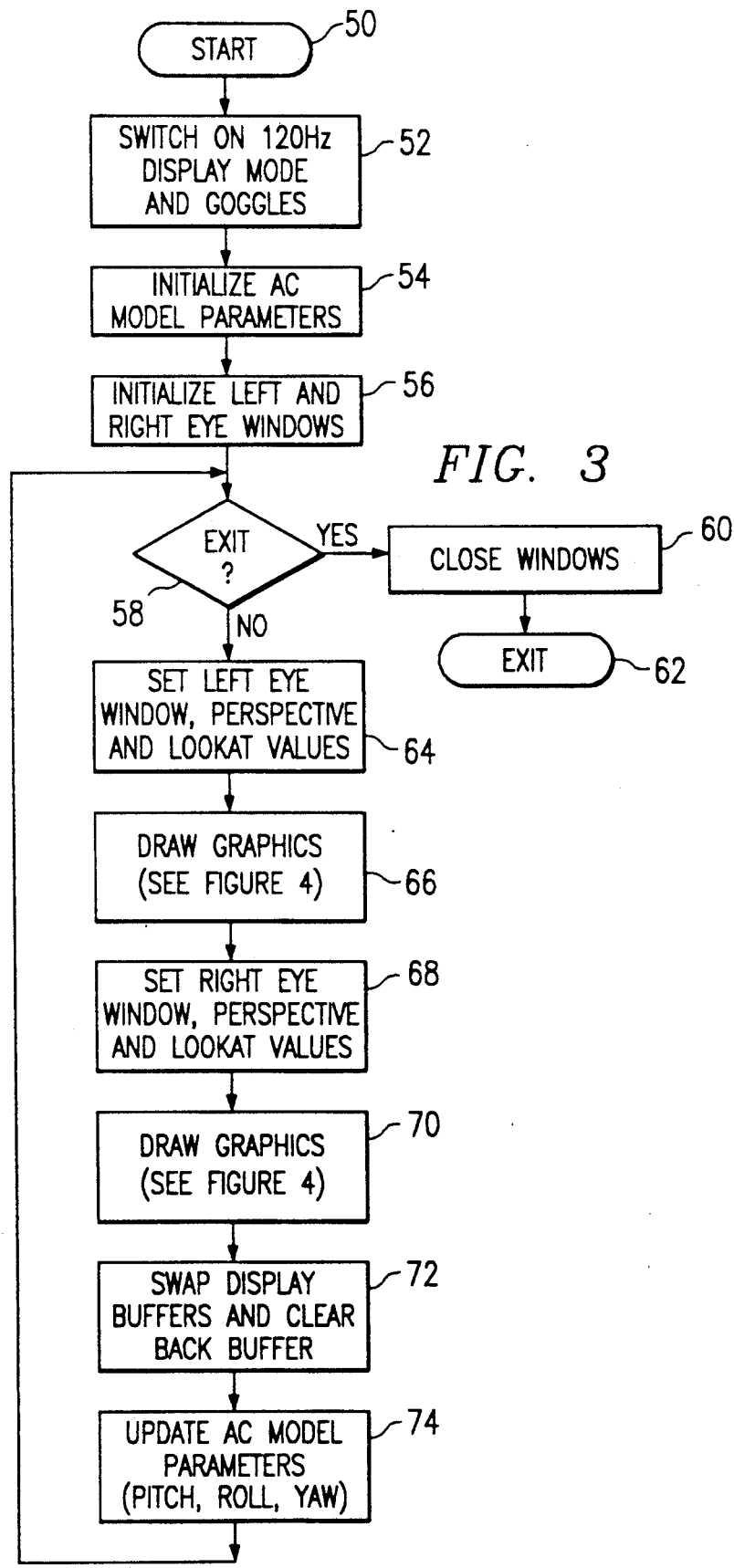
FIG. 3 is a flow diagram of the software used in operating the signal modifying means of FIG. 1.

In FIG. 3 the software is represented as commencing with the start oval 50 where the 120 hertz display mode is activated along with the goggles or lenses 32 in accordance with block 52. The software then initializes the AC model parameters in block 54 and initializes the left and right eye windows in block 56. The software then makes a decision in decision block 58 whether or not there is an exit indication and if there is, the software proceeds to a close window block 60 and proceeds to an exit oval 62. If there is no exit indication, the software proceeds to set the left eye window, perspective and viewpoint/view direction ("look at") values in accordance with block 64. The software then draws the graphics for the left eye into the back buffer in accordance with block 66. The software then sets the right eye window, perspective and look at values in block 68 and then draws the graphics for the right eye in block 70. Software then swaps the display buffers and clears the back buffer in block 72 before proceeding to update the aircraft model parameters of pitch, roll and yaw in block 74. From block 74, the software returns to the exit decision block 58 for another potential run through blocks 64 through 74 or to exit at 62. It should be noted that during the time from block 74 through the return to block 70, the system is alternately presenting the left eye view and right eye view to the viewer. When the system gets to block 72, the display buffer that was being used to present the material is swapped with the buffer that was being updated with the latest information, and the replaced buffer is then updated while the most recently updated buffer is used to provide the information to the display 14 of FIG. 1. For the embodiment discussed, the buffer containing current left and right eye views is read out every 1/60 second and a given view is presented to a given eye for about 1/120 of a second.

Figure 4:
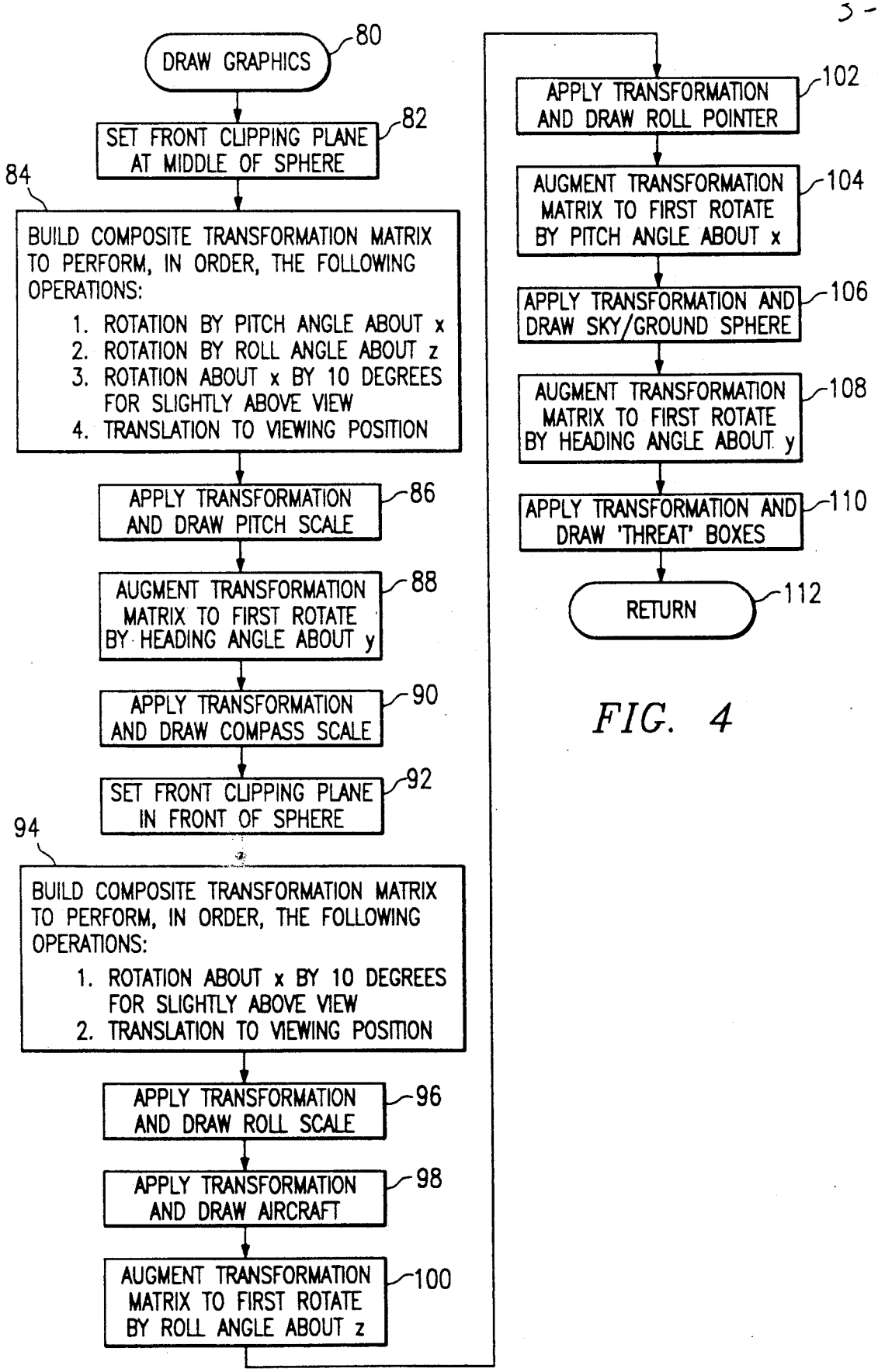
FIG. 4 is a flow diagram of the draw graphics portion of FIG. 3.

FIG. 4 illustrates the flow diagram of the draw graphics blocks 66 and 70 of FIG. 3. The following right-handed axis system is assumed: horizontal axis, X, and vertical axis, Y, lie in the plane of the screen; depth axis, Z, points out of the screen. As will be ascertained, the draw graphics oval 80 starts this subroutine and first sets a front clipping plane at the middle of the sphere in block 82. The program then proceeds to block 84 to build a composite transformation matrix to perform in order the operations of (1) rotation by pitch angle about X, (2) rotation by roll angle about the Z axis, (3) rotation about the X axis by ten degrees for a slightly above view and (4) translation to the viewing position. From there, the software proceeds to apply the transformation and draw the pitch scale in block 86. The program then augments the transformation matrix to first rotate by heading angle about the Y axis in block 88. The transformation is then applied and the compass scale is drawn in block 90. The clipping plane is then set to the front of the sphere in block 92 and a new composite transformation matrix is built in block 94 to perform rotation about X by ten degrees for a slightly above view and translation to the viewing position. In block 96 the transformation is applied and the roll scale is drawn. The transformation is applied and the aircraft is drawn in 98. In block 100 the transformation matrix is augmented to first rotate by roll angle about the Z axis. In block 102, the transformation is applied and the roll pointer is drawn. The transformation matrix is further augmented to rotate by pitch angle about the X axis in block 104 and the transformation is applied and used to draw the sky and ground sphere in block 106. The transformation matrix is augmented to rotate by the heading angle about the Y axis in block 108 and then the threat boxes are drawn in 110. The software then proceeds to the return oval 112 and continues in the appropriate block of the flow diagram shown in FIG. 3.

OPERATION

As previously indicated, the present invention is based upon the original concept of incorporating roll, pitch and heading information onto a flat display using alternating left and right eye views of a three dimensional situation which views are synchronized with switching lenses or goggles worn by the viewer such that the viewer is effectively presented with a stereoscopic vision of a craft such as an airplane with respect to its environment. While this concept could be applied equally well to space craft and submarines, the remaining description will be limited to the example of an airplane.

As also previously mentioned in connection with block 94 of FIG. 4, the view provided in one embodiment of the invention was approximately ten degrees above the airplane and from the rear.

The view in the first version reduced to practice comprises a spherical grid such as shown in both FIGS. 1 and 2. On the grid, the numbers from 0 to 4 on the top half of the grid and the numbers 1 through 7 on the bottom half of the grid provide an indication in tens of degrees of the pitch or angle of the craft with respect to horizontal (non-altitude changing) flight. In the display illustrated, each of the major headings of north, east, south and west are provided with a letter indicating the heading direction while the intermediate heading directions are signified by angle or degree indications provided by the 3, 6, 30, and 33 which are respectively indications of 30, 60, 300 and 330 degrees. Although not shown in either FIG. 1 or FIG. 2. an embodiment of the invention provided further angle divisions in the form of I-shaped bar icons for each ten degree increment of heading. In addition to the numbers indicating pitch, there are further indications on the pitch scale such as the arrow-shaped objects labeled 30, 30', 40, and 40' to show that the pitch of the aircraft either up or down from horizontal is approaching a value which may be detrimental to continued safe flight of the craft. From observing FIG. 2, it will be noted that the airplane 16 is shown as heading in substantially a North direction in level flight since the nose of the airplane points at the N or North indicator and the zero pitch indicator but is in the process of turning since its left wing is lower than the right wing as indicated by the roll indicator. The pointer 20 shows that the roll is at 15 degrees on scale 22.

As previously mentioned, the visualization by the viewer of the sphere with an aircraft in the center, allows the use of situational awareness cues such as 26 and 26'. These cues can provide a complete global view of military threats or the civilian traffic environment. A vector drawn from the viewer's own aircraft to a threat in the real world can be visualized in the display domain as a vector from the aircraft symbol to the three dimensional representation of the threat. A window or box drawn around where that vector pierces the display sphere as shown in FIG. 2 would then frame the threat. Color coding of the window can then be used such as red for threats, green for friendlies, and yellow for unknowns. The different colors are shown by the different markings of the windows such as 26,26' and 26".

As set forth in the flow diagram of FIG. 3, after initialization in blocks 50 to 56, the software contained in block 10 of FIG. 1 continuously cycles through the events of blocks 58 to 74 in FIG. 3 for drawing new left and right eye views in a spare or back buffer while displaying the left and right eye views in equal length sessions from the active buffer. After each left and right eye display as set forth in blocks 64 and 68 and drawing the graphics for each of the left and right eye views in the back or spare buffer in accordance with blocks 66 and 70, the display buffers are swapped as illustrated in block 72, and finally, the most recent information as to pitch, roll, yaw and threats is input and used to update registers as set forth in block 74 before repeating the cycle.

With respect to FIG. 4, a vertical clipping plane is established at the middle of the sphere and the clipped pitch scale and compass scale are drawn into the memory buffer in blocks 84 through 90.

The clipping plane is then set in front of the sphere and calculations are performed as detailed in block 94. The transformation matrix is then set for a ten degree rotation (for a slightly above view) and for translation to the viewing position. The drawing of the roll scale and roll pointer along with the aircraft are then detailed in blocks 96 through 102. The matrix is then augmented to provide rotation by the pitch angle in block 104, the sky ground sphere and the appropriate upper and lower colors are then added in block 106. The view is rotated by the heading angle in block 108 and finally, the threat boxes are added in block 110 before returning to FIG. 3. This process of FIG. 4 is provided for the left eye in block 66 of FIG. 3 and then provided again for the right eye view in block 70 of FIG. 3.

While the present inventive concept can be implemented in any of many ways, and can be utilized for craft other than airplanes, we wish to be limited not to the specific embodiment illustrated or the specific approach to generating the display such as illustrated by the flow diagrams, but rather wish to be limited only to the concept of using left and right eye views on a single display whereby stereopsis is exploited to combine information that normally requires a plurality of display surfaces as set forth in the appended claims wherein we claim:

1. A 3D display for use in ascertaining an aircraft orientation comprising, in combination:
   shuttered means for allowing only one eye at a time to view a display;
   display means for presenting left eye and right eye presentations synchronized with said shuttered means to evoke a 3D (three dimensional) view to one wearing said shuttered means; and
   signal modifying means, connected to said display means and to receive inputs of aircraft pitch, roll and heading information, for supplying left and right eye presentation signals to said display means whereby a viewer perceives,
   a) a stationary aircraft symbol situated in the center of a spherical grid with the rear surface of the aircraft symbol lying in plane parallel to the surface of said display means and with the nose of the aircraft symbol extending toward the far side of the sphere,
   b) a stationary roll scale lying in the same plane as the rear surface of the aircraft symbol,
   c) a pitch scale which is orthogonal to the roll scale and is presented on the far side of the sphere and moves in response to the pitch motion of said aircraft with the nose of the aircraft symbol indicating the current pitch value,
   d) a heading scale which is orthogonal to the pitch scale and is presented on the far side of the sphere and moves in response to the heading motion of said aircraft with the intersection of the pitch and roll scales indicating the current heading value,
   e) a roll pointer which lies in the same plane as the roll scale and in line with the pitch scale and which moves in response to the roll of said aircraft to indicate the current roll value.

2. Apparatus as claimed in claim 1 where;
   said signal modifying means additionally receives inputs of angular information relative to nearby objects occupying the airspace surrounding the aircraft and supplies left and right eye presentation signals to said display means whereby the viewer perceives indications on said spherical grid representing the angular position of said objects relative to the aircraft.

3. Apparatus as claimed in claim 2 where:
   said signal means additionally receives input signals relative to said nearby objects occupying the airspace surrounding the aircraft and supplies left and right eye presentation signals to said display means whereby the viewer perceives the indication on said spherical grid in colors to represent the object type.

4. The method of presenting roll, pitch and heading information representative of a given aircraft on a display to a viewer in a coordinated manner comprising the steps of:
   interleaving left and right eye views of an aircraft in the center of a spherical grid on the display having dynamically changing scales to give the appearance of movement of said scales on the far side of the sphere representing pitch and heading of the aircraft and a static scale above the sphere representing roll of the aircraft;

viewing said display in a manner such that the viewer's right eye sees only the right eye view and the viewer's left eye sees only the left eye view whereby the viewer perceives, a) a stationary aircraft symbol situated in the center of a spherical grid with the rear surface of the aircraft symbol lying in plane parallel to the surface of said display means and with the nose of the aircraft symbol extending toward the far side of the sphere, b) a stationary roll scale lying in the same plane as the rear surface of the aircraft symbol, c) a pitch scale which is orthogonal to the roll scale and is presented on the far side of the sphere and moves in response to the pitch motion of said aircraft with the nose of the aircraft symbol indicating the current pitch value.

5. The method of claim 4 comprising the additional steps of:

including interleaving left and right eye indications on the grid representing the angular position of any other objects in the surrounding airspace relative to said given aircraft to enable the viewer to better determine the threat of those objects to said given aircraft.

6. Apparatus for presenting roll, pitch and heading information representative of a given aircraft to a viewer in a coordinated manner comprising, in combination:

first means for interleaving left and right eye display views of an aircraft in the center of a spherical grid having dynamically changing scales on the far side of the sphere representing pitch and heading of the aircraft and a static scale above the sphere representing roll of the aircraft;

second means for enabling one to view said display in a manner such that the one's right eye sees only the right eye view and the one's left eye sees only the left eye view whereby the one perceives, a) a stationary aircraft symbol situated in the center of a spherical grid with the rear surface of the aircraft symbol lying in plane parallel to the surface of said display means and with the nose of the aircraft symbol extending toward the far side of the sphere, b) a stationary roll scale lying in the same plane as the rear surface of the aircraft symbol, c) a pitch scale which is orthogonal to the roll scale and is presented on the far side of the sphere and moves in response to the pitch motion of said aircraft with the nose of the aircraft symbol indicating the current pitch value, d) a heading scale which is orthogonal to the pitch scale and is presented on the far side of the sphere and moves in response to the heading motion of said aircraft with the intersection of the pitch and roll scales indicating the current heading value, and e) a roll pointer which lies in the same plane as the roll scale and in line with the pitch scale and which moves in response to the roll of said aircraft to indicate the current roll value.

7. Apparatus as claimed in claim 6 wherein:

said first means also provides interleaved left and right eye indications on the spherical grid of other objects in the space surrounding the given aircraft representative of the polar coordinate angles of those objects relative said given aircraft.

8. A 3D display for use in ascertaining a craft orientation comprising, in combination:

shuttered means for allowing only one eye at a time to view a display;

display means for presenting left eye and right eye presentations synchronized with said shuttered means to evoke a 3D (three dimensional) view to one wearing said shuttered means; and signal modifying means, connected to said display means and to receive inputs of a craft's pitch, roll and heading information, for supplying left and right eye presentation signals to said display means whereby a viewer perceives, a) a stationary craft symbol situated in the center of a spherical grid with the rear surface of the aircraft symbol lying in plane parallel to the surface of said display means and with the forward tip of the craft symbol extending toward the far side of the sphere, b) a stationary roll scale lying in the same plane as the rear surface of the craft symbol, c) a pitch scale which is orthogonal to the roll scale and is presented on the far side of the sphere and moves in response to the pitch motion of said craft with the hose of the craft symbol indicating the current pitch value, d) a heading scale which is orthogonal to the pitch scale and is presented on the far side of the sphere and moves in response to the heading motion of said craft with the intersection of the pitch and roll scales indicating the current heading value, e) a roll pointer which lies in the same plane as the roll scale and in line with the pitch scale and which moves in response to the roll of said craft to indicate the current roll value.

* * * * *